(12) United States Patent
Yilgor et al.

(10) Patent No.: US 7,262,260 B2
(45) Date of Patent: Aug. 28, 2007

(54) SEGMENTED UREA AND SILOXANE COPOLYMERS AND THEIR PREPARATION METHODS

(75) Inventors: Iskender Yilgor, Istanbul (TR); Emel Yilgor, Istanbul (TR); Garth L. Wilkes, Blacksburg, VA (US); Jignesh P. Sheth, Wilsonville, OR (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/152,844

(22) Filed: Jun. 15, 2005

(65) Prior Publication Data

US 2006/0014916 A1    Jan. 19, 2006

Related U.S. Application Data

(60) Provisional application No. 60/579,287, filed on Jun. 15, 2004.

(51) Int. Cl.
 *C08G 77/26* (2006.01)
(52) U.S. Cl. .................. 528/38; 525/479; 525/474

(58) Field of Classification Search .............. 528/38; 525/479, 474
See application file for complete search history.

(56) References Cited

U.S. PATENT DOCUMENTS 4,486,577 A * 12/1984 Mueller et al. ............ 525/474
5,792,554 A    8/1998 Leir et al.
6,495,091 B1  12/2002 Manson et al.

\* cited by examiner

*Primary Examiner*—Kuo-Liang Peng
(74) *Attorney, Agent, or Firm*—Blank Rome LLP

(57) ABSTRACT

Using novel synthetic techniques, siloxane-urea segmented copolymers are made. The copolymers advantageously contain a polyether interface, with controlled morphologies and properties. High molecular weight, high strength siloxane-urea copolymers with urea hard segment contents ranging from 5 to over 60% by weight may be prepared. Polymer properties that can independently be controlled include modulus (1.0 to 120 MPa), ultimate tensile strength (1.5 to 25 MPa), level of equilibrium water absorption (~0 to 100% by weight) and refractive index (1.43 to 1.46).

5 Claims, 8 Drawing Sheets

SEGMENTED UREA AND SILOXANE COPOLYMERS AND THEIR PREPARATION METHODS

CROSS-REFERENCE TO RELATED APPLICATIONS

This application claims priority to U.S. Provisional Application 60/579,287, filed Jun. 15, 2004, and the complete contents thereof is herein incorporated by reference.

FIELD OF THE INVENTION

This invention relates to segmented polymers, including copolymers and terpolymers, methods of producing segmented polymers, and controlling properties of segmented polymers.

BACKGROUND OF THE INVENTION

It has been an unrealized aim of synthetic polymer chemists to prepare multiphase block copolymers with well-defined hard and soft segment structures, block molecular weights, molecular weight distributions and architectures. Such copolymers would preferentially display phase separated microphase morphologies with a sharp interface between hard and soft phases. Investigation of the structure-morphology-property relations in these types of well-defined block and segmented copolymers has been one of the most active areas of research for over 40 years. Such polymer chemistry today is an important field both for academic and industrial interests and most probably will continue to be in the next decades.

Synthesis, characterization and structure-morphology-property relations in segmented polydimethylsiloxane-urea (also termed as PDMS-urea or silicone-urea) and silicone-urethane copolymers have been investigated for over two decades. Due to the substantial differences between the solubility parameters of polydimethylsiloxane [15.6 $(J/cm^3)^{1/2}$ or 7.6 $(cal/cm^3)^{1/2}$] and urea [45.6 $(J/cm^3)^{1/2}$ or 22.3 $(cal/cm^3)^{1/2}$] segments, it has been possible to design model silicone-urea copolymers with very good phase separation and a sharp interface between PDMS and urea phases. As well documented in the literature, in order to get the desired microphase morphologies important factors that need to be controlled include block molecular weights and their distribution and the hard/soft segment ratio in the copolymer. For silicone-urea copolymers there has seemed to be a critical PDMS molecular weight of about 2,500-3,000 g/mole in order to achieve good phase separation.

Certain methods for preparation of segmented copolymers, and certain segmented copolymers, have been known, such as certain segmented copolymers, which consist of a hard (e.g. urea or urethane) and a single soft segment (e.g. polyether, aliphatic polyester or PDMS). In some cases, in addition to the main soft segment (e.g. a polyether), system may be modified with small amounts of a second soft segment (e.g. PDMS). See, e.g., E. Yilgor and I. Yilgor, Polymer, 42(19), 7953-7959 (2001); E. Yilgor, E. Burgaz, E. Yurtsever and I. Yilgör, Polymer, 41(3), 849-857 (2000); U.S. Pat. No. 5,792,554 (Aug. 11, 1998).

However, in such segmented copolymers, incorporation of the second soft segment thus far has been random and construction of the resulting copolymer otherwise has been less controlled than would be desirable.

SUMMARY OF THE INVENTION

The present invention provides controlled construction of a segmented polymer, such as, e.g., controlling the region between hard and soft segment domains (such as, e.g., providing an intermediate segment functioning as an interface between the hard and soft segment domains); controlling in a non-random manner the incorporation of a second soft segment; etc.

A preferred embodiment of the invention provides a segmented copolymer or terpolymer comprising a urea hard segment, a siloxane soft segment, and a polyether segment disposed between the urea hard segment and the siloxane soft segment. The polyether segment functions as an interface (i.e., an interfacial agent) between the urea hard segment and the siloxane soft segment. In some applications, a strictly non-polar segment of the alkyl type, such as for example, segments based on butadiene or isoprene or hydrogenated versions thereof might be used instead of the polyether segment.

In another preferred embodiment the invention provides a polymeric material, comprising urea hard segments distributed with siloxane soft segments (i.e, urea hard segments being distributed within the siloxane soft segments or the siloxane soft segments be distributed within the urea hard segments), with polyether segments disposed between the urea hard segments and the siloxane soft segments. In the polymeric material, the polyether segments function as an interfacial agent between the urea hard segments and the siloxane soft segments, and can be viewed as an interphase therebetween (i.e, a transitional gradient from the hard segment to the soft segment). In one embodiment, the hard segments are non-uniformly distributed with said siloxane soft segments. The polymeric material may have urea hard segments constituting at least 10% by weight of said polymeric material (or 40% by weight or more). The polymeric materials preferably have a refractive index ranging from 1.43 to 1.46 at 25° C. Preferably, the polymeric materials have a modulus ranging from 1 to 120 MPa (preferably at least 30 MPa, and more preferably at least 50 MPa) at 25° C., and have an ultimate tensile strength of 1.5 to 25 MPa at 25° C. In one embodiment, the polymeric material has urea hard segments with a number average molecular weight ranging from 500 to 30,000 g/mole, siloxane soft segments with a number average molecular weight ranging from 500 to 20,000 g/mole, and polyether segments range from 200 to 5,000 g/mole. In another embodiment, the polymeric material has siloxane soft segments which include at least two chemically different soft segment polymers at least one of which is a polydimethylsiloxane.

In another preferred embodiment, the invention provides a method of preparing a segmented co-polymer, comprising the steps of: forming a solution (such as, e.g., a solution which includes, as a solvent, an alcohol (such as, e.g., isopropanol)) of reactive functionally terminated polydimethylsiloxane (PDMS) (such as, for example, α,ω-amine terminated PDMS), a diisocyanate, a polyether (POLYETH) (such as, for example, α,ω-amine terminated poly(ethylene oxide) or poly(propylene oxide)) and a low molecular weight diamine (such as for example, ethylene diamine (EDA) or hexamethylene diamine (HMDA). The invention contemplates adding amine terminated PDMS and POLYETH and a diamine to said solution in a stoichiometric amount relative to said diisocyanate. In a preferred embodiment, the diamine is combined with the same alcohol used in the diisocyanate containing solution prior to the step of adding being performed. Where the reaction solvent is not an alcohol, the adding step uses a diol. In the preferred embodiment, the diisocyanate has the general structure OCN—R—NCO, where R is an alkyl, aryl, or aralkyl moiety having 4 to 20 carbon atoms, the diamine has the general structure $HR_1N$—$R_2$—$NR_1H$, where $R_1$ is a hydrogen, halogen, or alkyl group having 1-4 carbon atoms, and $R_2$ is an alkyl, aryl, or alkaryl group having 2 to 20 carbon atoms, and the diol has the general structure HO—$R_3$—OH, $R_3$ is an alkyl, aryl, or alkaryl group having 2 to 20 carbon atoms.

BRIEF SUMMARY OF THE DRAWINGS

In FIG. 2, influence of the incorporation of a polyether intermediate segment functioning as an interface on the dynamic mechanical behavior of these materials can clearly be seen.

DETAILED DESCRIPTION OF A PREFERRED EMBODIMENT OF THE INVENTION

Figure 1:
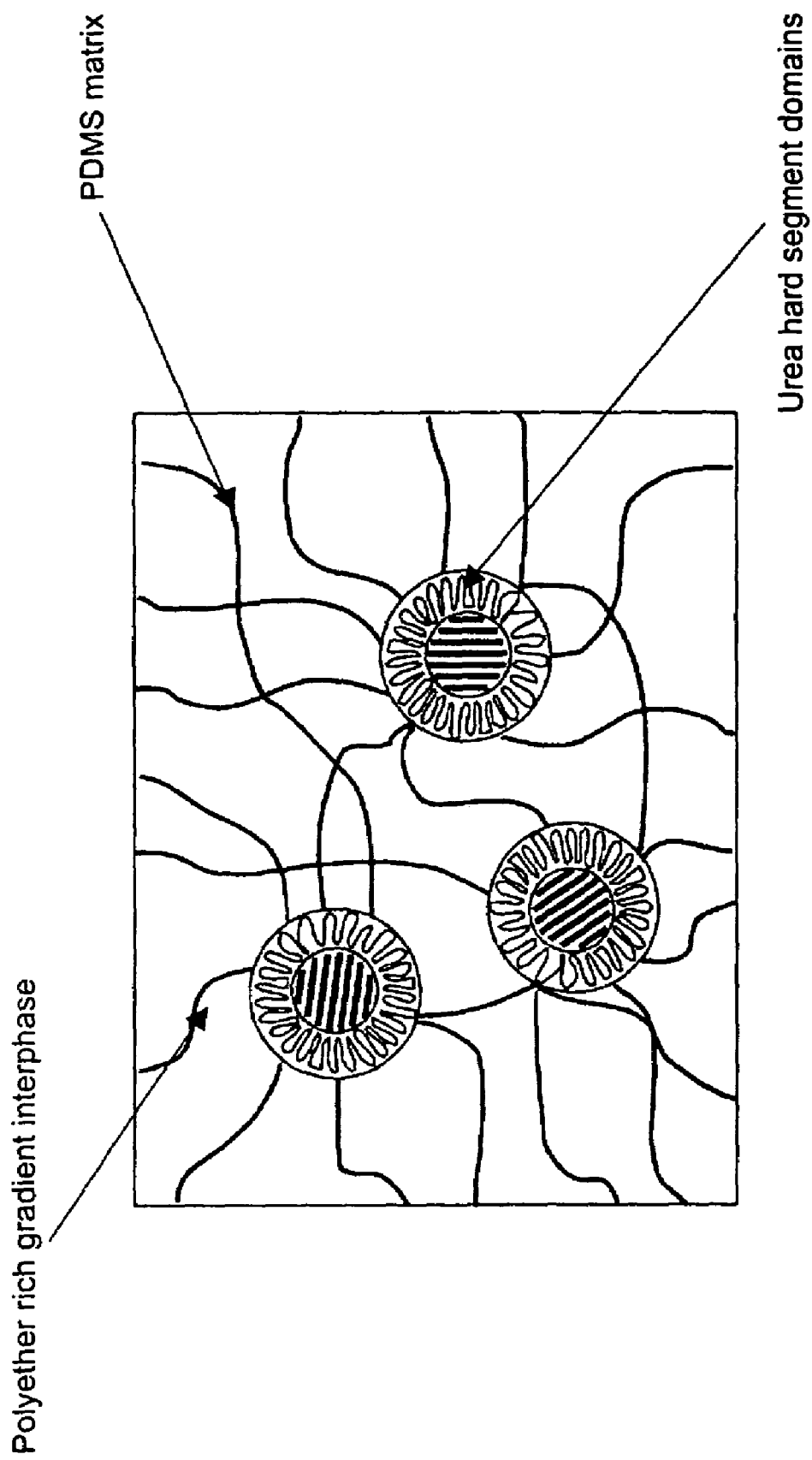
FIG. 1 is a schematic representation of the microphase morphology of the polydimethylsiloxane-urea copolymers with a polyether interface. The polyether provides a transition or gradient from the hard segment to the soft segment and can be viewed as an "interphase" between the soft and hard segments.
Figure 2:
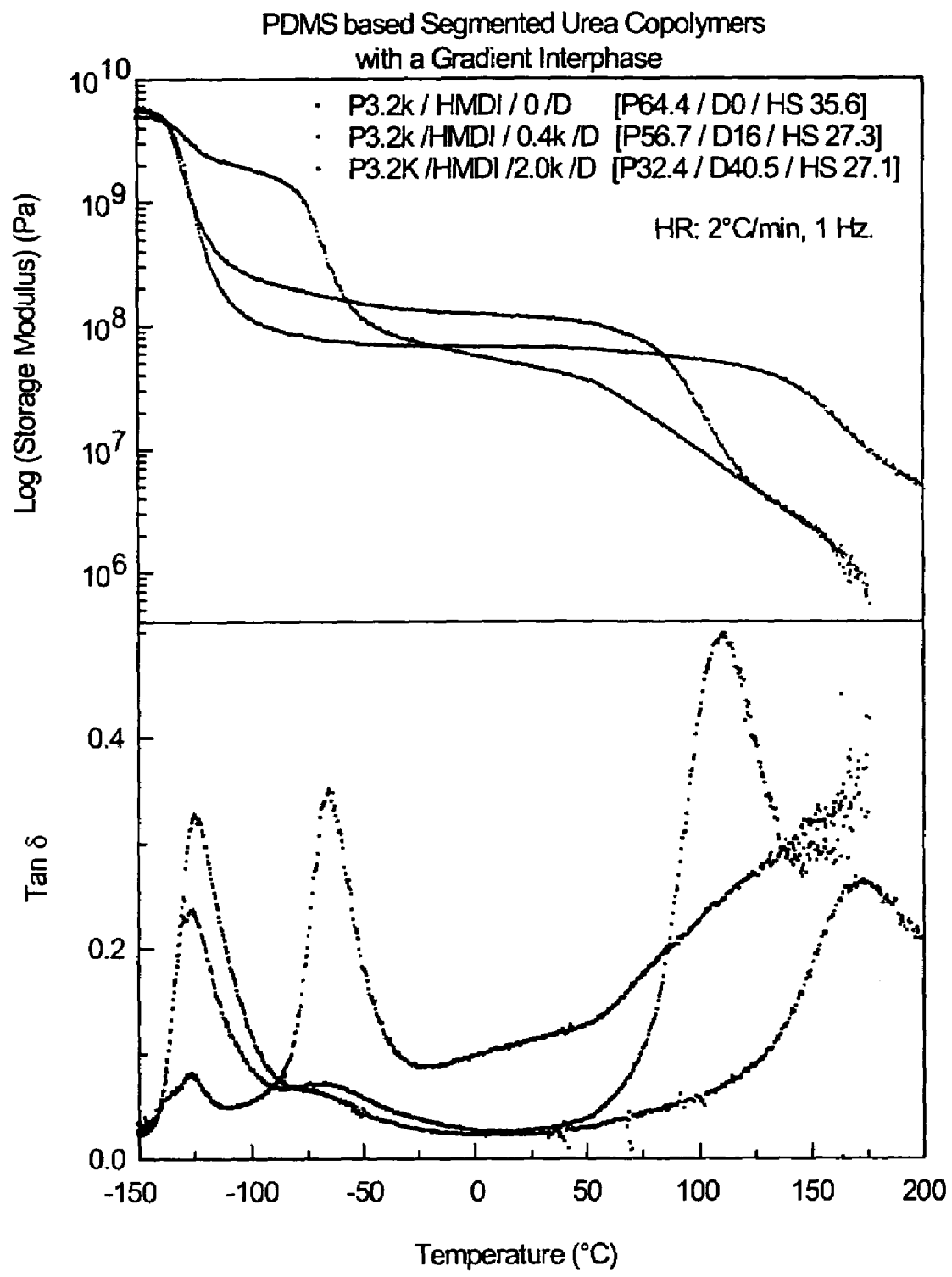
FIG. 2 is a graph showing the dynamic mechanical behavior of HMDI and PDMS-3200 based polyurea chain extended with 2-methyl-1,5-diaminohexane (DY) with no polyether intermediate segment (P3.2 k/HMDI/0/D), with a PPO-400 intermediate segment functioning as an interface (P3.2 k/HMDI/0.4k/D) and with a PPO-2000 intermediate segment functioning as an interface (P3.2 k/HMDI/2.0 k/D).

The present inventors have recognized that something other than a sharp transition between segments may be advantageous in certain segmented polymers, such as those which contain urea hard segments (e.g., polyurea polymers or oligomers, polyurethane polymers or oligomers, or combinations thereof) and siloxane soft segments (e.g., segments containing polydimethylsiloxane). The context of this invention the term segmented polymer or oligomer is intended to cover copolymers and terpolymers and it should be understood that the terms may be used interchangeably herein; the term "interface" means the polymeric region or the phase between PDMS soft and urea hard segments in the segmented polymers and an "interfacial agent" is the material which is at the interface; the term "polyether segment" means that the chemical structure or composition of the polymeric region or the phase between the PDMS soft and urea hard segments in the copolymers contains a polyether such as poly(ethylene oxide) or poly(propylene oxide), and the polyether segment is essentially an "intermediate segment" which acts as an interfacial agent, and further, in some embodiments of the invention a "non-polar alkyl segment" may be substituted for the "polyether segment" as the intermediate segment; and the terms "sharpness" or "non-sharpness" of the interphase between hard and soft segments in a segmented copolymer may be determined by techniques such as dynamic mechanical analysis, scattering methods, electron microscopy, etc.

In the preferred embodiment, a polyether segment is disposed between the urea hard segments and the siloxane soft segments. The polyether segment functions as an interfacial agent between the soft and hard segments, and essentially creates and interphase or gradient between the soft and hard segments. Examples of polyethers may include polyethylene oxides, polypropylene oxides, and polytetramethylene oxide. By "interface" or "interfacial agent" or "interphase region", it is meant that the polyether segment is positioned between and associated with or bonded to the hard segment at one section and associated with or bonded to the soft segment at another section. A strictly non-polar segment of the alkyl type such as a segment based on either butadiene or isoprene and hydrogenated versions thereof, may also be used in place of the polyether segment and would function to provide an interface between the urea hard segments and siloxane soft segments.

Urea hard segments are generally known and the urea hard segments useable in this invention are not particularly limited. The "hard segments" may include polyurea polymers or oligomers formed from diisocynates and diamines. For example, the diisocyanates may have the general structure OCN—R—NCO, where R is an alkylene, arylene, or aralkylene moiety having 4 to 20 carbon atoms, and the diamine may have the general structure $HR_1N$—$R_2$—$NR_1H$, where $R_1$ is a hydrogen, halogen, or alkyl group having 1-4 carbon atoms, and R2 is an alkylene, arylene, or aralkylene group having 2 to 20 carbon atoms. The urea hard segments may also include polyurethane polymers or oligomers formed from diisocyanates and diols, where the diisocyanates have the general structure OCN—R—NCO, where R is an alkylene, arylene, or aralkylene moiety having 4 to 20 carbon atoms, and the diols have the general structure HO—$R_3$—OH, $R_3$ is an alkylene, arylene, or aralkylene group having 2 to 20 carbon atoms. The urea hard segments may be different from one another where a polymeric material formed according to the invention includes both polymeric or oligomeric polyureas and polyurethanes, and may also include polyurethane ureas. Preferably in an inventive segmented copolymer or polymeric material the urea hard segment constitutes 3-50% by weight of the segmented copolymer, and preferably around 10% by weight of the segmented copolymer.

Siloxane soft segments are generally known and the siloxane soft segments useable in this invention are not particularly limited. An example of a siloxane soft segment is, e.g., a siloxane soft segment that includes polydimethylsiloxane (PDMS) having the general structure —[SiO(CH$_3$)$_2$]$_n$— where n ranges from 5 to 300. The PDMS may be incorporated in the inventive segmented copolymer as an amine terminated polymer or oligomer having the general structure HR$_1$N—R$_4$—[SiO(CH$_3$)$_2$]$_n$—R$_4$—NR$_1$H wherein R$_1$ is a hydrogen, halogen or alkyl group having 1 to 4 carbon atoms, R$_4$ is an alkyl, aryl, or aralkyl group having 2 to 20 carbon atoms, and n ranges from 5 to 300, or a hydroxyl terminated oligomer having the general structure HO—R$_5$—[SiO(CH$_3$)$_2$]$_n$—R$_5$—OH, where R$_5$ is an alkyl group having 3 to 12 carbon atoms and n ranges from 5 to 300; etc. Including PDMS in a siloxane soft segment is preferred for a polymeric material.

Examples of a polyether segment for use in the invention are, e.g., a polyether segment that includes one or more of a polyethylene oxide, polypropylene oxide, and polytetramethylene oxide (such as, preferably, a polyether segment having a number average molecular weight ranging from 200 to 5000 g/mole); a polyether segment that has the general structural formula —[OR$_6$]$_m$— where R$_6$ includes 2 to 4 carbons, and where m ranges from 5 to 600; etc.

A siloxane-urea segmented copolymer containing a polyether intermediate segment functioning as an interface may be produced by a three-step "modified prepolymer" method. For example, the prepolymer may be obtained in two steps by (i) the addition of a reactive functionally terminated, telechelic polydimethylsiloxane (PDMS) solution (such as, e.g., PDMS solution comprising PDMS oligomers with number average molecular weights (Mn) between 500 and 20,000 g/mol) onto a diisocyanate solution followed by (ii) addition of a reactive functionally terminated, telechelic polyether (POLYETH) solution (such as, e.g., POLYETH solution comprising POLYET oligomers with number average molecular weights (Mn) between 200 and 5,000 g/mol), and (iii) after the step of obtaining the prepolymer, optionally a chain extension step may be performed in which stoichiometric amounts of dissolved diamines or diols are added to a solution of the prepolymer. Inventive segmented copolymers are thereby produced, such as a siloxane-urea copolymer that includes a urea hard segment content ranging from about 5% to over 60% by weight (such as, e.g., wherein the urea hard segment content is in a range of 3% to over 40% by weight; etc.). By using such production methods, it may be possible to control, in the product, one or more of: modulus of the produced copolymer in a range of about 1.0 to 120 MPa, controlling ultimate tensile strength of the produced copolymer in a range of about 1.5 to 25 MPa, controlling level of equilibrium water absorption in the produced polymer in a range of ~0 to 100% by weight; and controlling refractive index in the produced copolymer in a range of about 1.43 to1 0.46.

Examples of a chain extender structure are as follows: for polyurea copolymers, a structure for diamine chain extenders; for polyurethane copolymers, a structure for diol chain extenders. An example of a diamine chain extender structure is HR$_1$N—R$_2$—NR$_1$H, where R$_1$ can be a hydrogen atom or an alkyl group with 1 to 4 carbon atoms and R$_2$ can be aliphatic (alkyl), aromatic (aryl) or aralkyl and contains 2 to 20 carbon atoms. An example of a diol chain extender structure is OH—R$_3$—OH, where R$_3$ can be aliphatic (alkyl) or aralkyl and contains 2 to 20 carbon atoms.

The invention may be used, for example, to produce a siloxane-urea segmented copolymer, having a modulus in a range of about 1.0 to 120 MPa (such as, e.g., a modulus of at least 10, etc.), an ultimate tensile strength in a range of about 1.5 to 25 MPa (such as, e.g., an ultimate tensile strength is in a range of about 2.5 to 22 MPa.), a level of equilibrium water absorption in a range of about ~0 to 100% by weight and a refractive index in a range of about 1.43 to 1.46; such as, e.g., siloxane-urea segmented copolymers wherein the copolymer is a segmented polyurea elastomer; siloxane-urea segmented copolymers wherein the copolymer is a segmented polyurethane type elastomer; copolymers containing at least two different soft segments, one soft segment being a polydimethylsiloxane (PDMS); etc.

An example of a use for a material produced according to the invention is in an intraocular lens, such as, e.g., an intraocular lens comprising a siloxane-urea segmented copolymer, having a modulus in a range of about 1.0 to 120 MPa, an ultimate tensile strength in a range of about 1.5 to <22 MPa, a level of equilibrium water absorption in a range of about ~0 to 100% by weight and a refractive index in a range of about 1.43 to 1.46.

PDMS containing silicone-urea copolymers display a combination of very interesting properties. These include very low glass transition temperatures (–123° C.), high thermal, UV and oxidative stability, low surface energy, hydrophobicity, high gas permeability, good electrical properties and biocompatibility. In spite of these attractive properties, silicone containing thermoplastic elastomers usually display low tensile strengths when compared with conventional elastomeric systems. This might not seem to be very surprising because, even highly filled and crosslinked PDMS elastomers display ultimate tensile strengths of about 10-12 MPa.

Mechanical properties and ultimate strength of multiphase copolymers are closely related to their complex, heterogeneous supramolecular structure. Large number parameters including chemical (bond strength) and structural factors (crystallinity, hydrogen bonding, defects), processing conditions and thermal history play major roles in determining the microphase morphology of copolymers. For block or segmented copolymers, an especially important parameter which the present inventors have recognized but otherwise may not be apparent, is the nature and properties of the interface between two phases. Sharpness between two phases with dissimilar properties could create a weak point in a block copolymer. For example, in biological systems (e.g. proteins) this problem is solved by creating a gradient rather than a sharp transition between phases.

When compared with their polyether-based homologs, silicone-urea copolymers display much lower ultimate tensile strength and fairly low elongation at break values as shown in Table 1. This may be due to (i) the lack of stress-induced crystallization in PDMS at room temperature, (ii) the inherent mechanical weakness of the PDMS chains, since at room temperature they are about 150° C. above their Tg values, or (iii) the presence of a very sharp transition between continuous PDMS matrix and urea domains, leading to a poor energy transfer mechanism between the PDMS and urea phases and thus poor tensile properties. It is not possible to have any control on the phenomena described in (i) and (ii), however, it is possible to controllably modify the structure and nature of the interface between PDMS and urea segments by using reactive polyether oligomers, such as α,ω-functionally terminated (e.g. amine or hydroxyl) reactive poly(ethylene oxide) (PEO), poly(propylene oxide) (PPO), poly(tetramethylene oxide) (PTMO) oligomers or α,ω-hydroxy terminated aliphatic polyesters.

With inventive design and incorporation of polyether segments into polydimethylsiloxane-urea copolymers, the ultimate tensile strengths of these materials may be dramatically improved. In addition to the tensile strengths, other properties that can be controllably modified or improved, include; solubility of the polymer, Young's modulus, tear strength, hydrophobic/hydrophilic balance, water uptake, refractive index and biocompatibility. The ability that the present invention provides to manipulate such properties makes the copolymers of the present invention useable in a variety of important end use applications.

Polyether oligomers are preferred for use in the present invention, for several major reasons. First, a wide range of reactive PEO, PPO and PTMO oligomers with number average molecular weights ranging from 200 to 10,000 g/mole are available. Second, PEO, PPO and PTMO have solubility parameters which are, respectively, 24.5 $(J/cm^3)^{1/2}$, 23.5 $(J/cm^3)^{1/2}$ and 18.6 $(J/cm^3)^{1/2}$ which are in between that of PDMS and urea. Third, for polyether oligomers, reasonably strong hydrogen bonding interaction occurs between ether and urea groups, leading to the formation of a non-sharp interface in these copolymers. In FIG. 1, a schematic representation of the microphase morphology that is expected to form in these systems is shown. Critical parameters, which may have strong influence on controlling the structure and nature of the interface to be formed include: (i) type of the polyether used (PEO, PPO, PTMO or their copolymer) (ii) average molecular weight of the polyether (control of interface thickness), (iii) amount of the ether groups incorporated into the system (control of extent of interaction with urea hard segments), (iv) urea hard segment content of the polymer and (v) average molecular weight of the PDMS oligomer in the copolymers.

adhesives; coatings; specialty elastomers; wound dressings; carriers for timed release drug delivery systems; intraocular lenses; etc.

The invention may be better appreciated with regard to the Example given below, but the invention is not limited to the Example.

INVENTIVE EXAMPLE 1

Materials

An α,ω-Aminopropyl terminated polydimethylsiloxane (PDMS) oligomer with number average molecular weight of 3200 g/mole was obtained from Wacker Chemie, Munich, Germany. An α,ω-N-methylaminopropyl terminated polydimethylsiloxane (PDMS) oligomer with number average molecular weight of 7000 g/mole was obtained from Th. Goldschmidt A G, Essen, Germany. Aminopropyl terminated poly(ethylene oxide) (PEO) and poly(propylene oxide) oligomers with Mn values ranging from 230 to 2000 g/mole were obtained from Huntsman Chemical Corp. Number average molecular weights (Mn) of amine-terminated oligomers were determined by the titration of the end groups with standard hydrochloric acid. Bis(4-isocyanatocyclohexyl)methane (HMDI) with a purity of greater than 99.5% was supplied by Bayer AG. Reagent grade ethylene diamine (ED) and 1,6-diaminohexane (HMDA) were purchased from Aldrich and used as received. 2-methyl-1,5-diaminopentane (DY) was supplied by Du Pont. Reagent

TABLE 1

Comparison of the tensile properties of HMDI based PDMS-urea and polyether-urea segmented copolymers with similar compositions

| Sample code | Soft segment | | Urea HS | $[\eta]^*$ | Mod. | Tens. St. | Elong. |
| --- | --- | --- | --- | --- | --- | --- | --- |
| | Type | Mn (g/mole) | (wt %) | (dL/g) | (MPa) | (MPa) | (%) |
| PSU-DY-20 | PDMS | 2500 | 20 | 0.48 | 20.6 | 7.90 | 205 |
| PSU-HM-20 | PDMS | 2500 | 20 | 0.46 | 18.9 | 8.10 | 195 |
| PSU-ED-19 | PDMS | 2500 | 19 | 0.54 | 21.3 | 8.30 | 180 |
| PEU-DY-20 | PEO | 2000 | 20 | 0.81 | 4.30 | 25.4 | 1320 |
| PEU-HM-20 | PEO | 2000 | 20 | 0.66 | 4.20 | 25.8 | 1325 |
| PEU-ED-19 | PEO | 2000 | 19 | 0.72 | 4.50 | 26.5 | 1450 |

*Intrinsic viscosities were determined in IPA at 23° C.

The present invention may be better appreciated by considering the following. Mechanical properties and ultimate strength of multiphase copolymers are closely related to their complex, heterogeneous, supramolecular structure. A large number parameters including chemical (bond strength) and structural factors (crystallinity, hydrogen bonding, defects, etc.), processing conditions and thermal history play major roles in determining the microphase morphology of copolymers. For block or segmented copolymers, an especially important parameter, which sometimes may not be recognized as important, is the nature and properties of the interface between the two phases. A sharp transition between two phases with dissimilar properties could create a weak point in a block copolymer. In biological systems (e.g. proteins) this problem is solved by creating a gradient rather than a sharp transition between phases. The present invention may be applied to construct desirable copolymers containing a gradient rather than a sharp transition.

Applications for the present invention include, but are not limited to, e.g., biomaterials; permselective membranes;

grade isopropanol (IPA) purchased from Carlo Erba was used as the reaction solvent without further purification.

Polymer Synthesis

All polymers were prepared by using a three-step, "modified prepolymer method" as shown in Scheme 1. Reactions were carried out in three-neck, round bottom flasks equipped with overhead stirrer, nitrogen inlet and addition funnel. Reactions were carried out at room temperature. Prepolymer was obtained in two steps by (i) the dropwise addition of PDMS solution in IPA onto the HMDI solution in the reactor (also in IPA) followed by (ii) the addition of polyether (PEO or PPO) solution (in IPA) into the reactor. During the chain extension step, stoichiometric amounts of diamines were dissolved in IPA and added into the reactor dropwise, through the addition funnel. Completion of the reactions was determined by FTIR spectroscopy, following the disappearance of strong isocyanate peak at 2270 cm-1. Reaction mixtures were always homogeneous and usually clear throughout the reactions. No precipitation was observed.

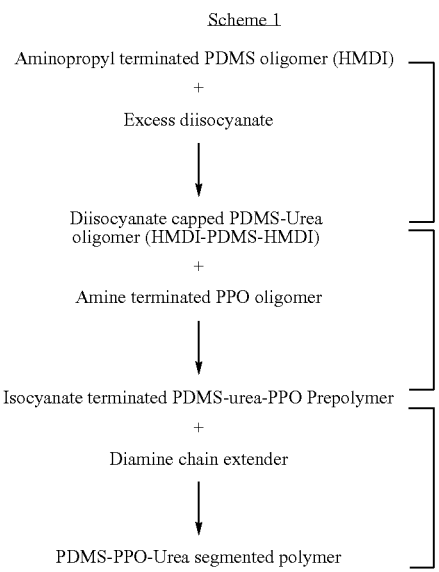

Scheme 1

Aminopropyl terminated PDMS oligomer (HMDI)
+
Excess diisocyanate
} Step 1

↓

Diisocyanate capped PDMS-Urea oligomer (HMDI-PDMS-HMDI)
+
Amine terminated PPO oligomer
} Step 2

↓

Isocyanate terminated PDMS-urea-PPO Prepolymer
+
Diamine chain extender
} Step 3

↓

PDMS-PPO-Urea segmented polymer

Polymer Characterization

FTIR spectra of thin films cast on KBr disks from IPA solutions were obtained on a Nicolet Impact 400D spectrometer, with a resolution of 2 cm$^{-1}$. Stress-strain tests were carried out on an Instron Model 4411 Universal Tester, at room temperature, with a crosshead speed of 25 mm/min. Dog-bone samples were punched out of thin copolymer films using a standard die. Polymers films used in characterization experiments were cast from IPA solution into Teflon molds, dried at room temperature overnight, followed by drying at 65° C. until constant weight is reached. Dynamic mechanical thermal analyses were obtained using a Seiko Instrument Model DMS210 system, under nitrogen atmosphere between −150 and 250° C. Measurements were made at a frequency of 1 Hz, with a heating rate of 2° C./min.

Experimental Results

Table 2 provides a detailed description of the tensile behavior of PDMS-Urea copolymers based on HMDI, PDMS (oligomers with Mn 2500, 3200 and 7000 g/mol) and chain extended with ED or DY. These systems which have urea hard segment contents between 16 and 41.5% by weight do not contain a polyether interface.

TABLE 2

Stress-strain behavior of Silicone-urea copolymers with sharp transition

| Polymer | PDMS (Mn) | PDMS (Wt %) | HS (Wt %) | Modulus (MPa) | Tensile strength (MPa) | Elongation (%) |
|---|---|---|---|---|---|---|
| 25/H/ED | 2500 | 84.0 | 16.0 | 15.2 | 5.60 | 175 |
| 25/H/ED | 2500 | 77.0 | 23.0 | 31.0 | 8.80 | 110 |
| 25/H/ED | 2500 | 70.0 | 30.0 | 90.0 | 13.5 | 90 |
| 25/H/DY | 2500 | 83.0 | 17.0 | 20.0 | 6.00 | 250 |
| 25/H/DY | 2500 | 75.1 | 24.9 | 30.0 | 7.80 | 130 |
| 25/H/DY | 2500 | 58.5 | 41.5 | 120 | 18.2 | 70 |
| 32/H/ED | 3200 | 75.0 | 25.0 | 35.2 | 14.6 | 235 |
| 70/H/ED | 7000 | 75.0 | 25.0 | 13.5 | 7.10 | 130 |
| 32/H/DY | 3200 | 83.3 | 16.7 | 16.4 | 9.70 | 265 |
| 32/H/DY | 3200 | 75.8 | 24.2 | 22.3 | 13.2 | 205 |
| 32/H/DY | 3200 | 69.6 | 30.4 | 34.4 | 17.9 | 160 |
| 32/H/DY | 3200 | 64.4 | 35.6 | 52.9 | 22.0 | 150 |
| 70/H/DY | 3200 | 75.0 | 25.0 | 35.2 | 14.6 | 235 |
| 70/H/DY | 7000 | 75.0 | 25.0 | 13.5 | 7.10 | 130 |

Detailed description of polymer compositions and tensile properties of PDMS-Urea copolymers with polyether interfaces are given in Table 3. Results provided clearly show substantial increases in the ultimate tensile strength and elongation at break values of the new copolymers with a gradient interface when compared to their analogs, shown on Table 2, with no gradient interface.

TABLE 3

Stress-strain behavior of Siloxane-urea copolymers with a gradient interface between hard and soft segments

| Polymer | PDMS (Mn) | PDMS (Wt %) | Polyether (Mn) | Polyether (Wt %) | HS (Wt %) | Mod (MPa) | TS (MPa) | Elong (%) |
|---|---|---|---|---|---|---|---|---|
| 32/2120/H/ED | 3200* | 77.8 | — | — | 22.2 | 108 | 12.6 | 205 |
| 32/2120/H/DY | 3200* | 76.5 | — | — | 23.5 | 105 | 11.8 | 205 |
| 32/H/D230 | 3200 | 71.6 | 240 | 10.7 | 28.4 | 38.5 | 14.0 | 280 |
| 32/H/D230 | 3200 | 58.5 | 240 | 17.6 | 41.5 | 90.5 | 14.0 | 125 |
| 32/ED900/H/ED | 3200 | 49.8 | 900 | 28.0 | 22.2 | 9.30 | 13.3 | 675 |
| 32/ED600/H/ED | 3200 | 54.3 | 630 | 21.4 | 24.3 | 29.1 | 17.4 | 370 |
| 32/D400/H/ED | 3200 | 57.9 | 450 | 16.3 | 25.8 | 103 | 17.5 | 210 |
| 32/D230/H/ED | 3200 | 62.6 | 240 | 9.4 | 28.0 | 92 | 17.4 | 140 |
| 32/ED900/H/DY | 3200 | 48.9 | 900 | 27.5 | 23.6 | 9.30 | 11.5 | 600 |
| 32/ED900/H/DY | 3200 | 43.8 | 900 | 24.7 | 31.5 | 41.0 | 17.5 | 340 |
| 32/ED900/H/DY | 3200 | 52.1 | 900 | 14.7 | 33.2 | 63.8 | 15.5 | 200 |
| 32/ED900/H/DY | 3200 | 49.1 | 900 | 13.8 | 37.1 | 81.0 | 20.2 | 170 |
| 32/D2000/H/DY | 3200 | 33.7 | 2000 | 42.1 | 24.2 | 18.8 | 17.2 | 580 |
| 32/D2000/H/DY | 3200 | 32.4 | 2000 | 40.5 | 27.1 | 29.6 | 19.8 | 525 |
| 32/D2000/H/DY | 3200 | 42.0 | 2000 | 26.2 | 31.8 | 45.6 | 17.7 | 375 |

TABLE 3-continued

Stress-strain behavior of Siloxane-urea copolymers with a gradient interface between hard and soft segments

| Polymer | PDMS (Mn) | PDMS (Wt %) | Polyether (Mn) | Polyether (Wt %) | HS (Wt %) | Mod (MPa) | TS (MPa) | Elong (%) |
|---|---|---|---|---|---|---|---|---|
| 32/ED600/H/DY | 3200 | 53.3 | 630 | 21.0 | 25.7 | 31.7 | 17.0 | 365 |
| 32/D400/H/DY | 3200 | 56.7 | 450 | 16.0 | 27.3 | 92.0 | 15.8 | 205 |
| 32/D230/H/DY | 3200 | 61.3 | 240 | 9.2 | 29.5 | 80.8 | 17.8 | 130 |
| 32/ED2003/H/DY | 3200 | 32.4 | 2000 | 40.5 | 27.1 | 15.7 | 10.7 | 830 |
| 70/2120/H/ED | 7000* | 86.0 | — | — | 14.0 | 11.6 | 2.45 | 115 |
| 70/2120/H/DY | 7000* | 85.1 | — | — | 14.9 | 11.4 | 3.50 | 185 |
| 70/ED900/H/ED | 7000 | 68.4 | 900 | 17.6 | 14.0 | 1.65 | 2.65 | 530 |
| 70/ED600/H/ED | 7000 | 72.2 | 630 | 13.0 | 14.8 | 2.65 | 2.60 | 185 |
| 70/ED600/H/ED | 7000 | 67.7 | 630 | 12.2 | 20.1 | 14.60 | 6.60 | 135 |
| 70/D400/H/ED | 7000 | 75.0 | 450 | 9.7 | 15.3 | 2.20 | 3.70 | 160 |
| 70/D230/H/ED | 7000 | 78.6 | 240 | 5.4 | 16.0 | 2.15 | 2.15 | 105 |
| 70/ED600/H/ED | 7000 | 67.7 | 630 | 12.2 | 20.1 | 14.60 | 6.60 | 135 |
| 70/HMDI/ED | 7000 | 75.0 | — | — | 25.0 | 13.50 | 7.10 | 130 |
| 70/ED900/H/DY | 7000 | 67.7 | 900 | 17.4 | 14.9 | 1.60 | 2.35 | 540 |
| 70/ED900/H/DY | 7000 | 63.1 | 900 | 16.2 | 20.7 | 5.40 | 3.70 | 170 |
| 70/ED600/H/DY | 7000 | 71.4 | 630 | 12.9 | 15.7 | 2.15 | 2.40 | 210 |
| 70/D400/H/DY | 7000 | 74.2 | 450 | 9.5 | 16.3 | 3.60 | 4.50 | 195 |
| 70/D230/H/DY | 7000 | 77.6 | 240 | 5.3 | 17.1 | 2.50 | 2.80 | 120 |
| 70/D2000/H/DY | 7000 | 51.2 | 2000 | 29.2 | 19.6 | 10.5 | 10.4 | 520 |
| 70/D2000/H/ED | 7000 | 52.2 | 2000 | 29.9 | 17.9 | 10.4 | 9.60 | 565 |
| 70/ED2003/H/DY | 3200 | 51.2 | 2000 | 29.2 | 27.1 | 5.15 | 7.30 | 730 |

Comparative refractive index values for copolymers with and without a gradient interface are provided on Table 4. Through incorporation of a polyether interface it was possible to increase the refractive indices of the polymers to 1.45-1.46 range. This is an important improvement, and suggests that inventive copolymers may be used as intraocular lenses.

TABLE 4

Refractive indices of silicone-urea copolymers

| Polymer | PDMS (Mn) | PDMS (Wt %) | Polyether (Mn) | Polyether (Wt %) | HS (Wt %) | RI |
|---|---|---|---|---|---|---|
| 32/H/DY | 3200 | 83.3 | — | — | 16.7 | 1.4335 |
| 32/H/DY | 3200 | 75.8 | — | — | 24.2 | 1.4406 |
| 32/H/DY | 3200 | 69.6 | — | — | 30.4 | 1.4480 |
| 32/2120/H/DY | 3200 | 76.5 | — | — | 23.5 | 1.4490 |
| 32/D400/H/DY | 3200 | 56.7 | 450 | 16.0 | 27.3 | 1.4550 |
| 32/ED600/H/DY | 3200 | 53.3 | 630 | 21.0 | 25.7 | 1.4573 |
| 32/ED900/H/DY | 3200 | 48.9 | 900 | 27.5 | 23.6 | 1.4589 |
| 32/D2000/H/DY | 3200 | 33.7 | 2000 | 42.1 | 24.2 | 1.4608 |
| 70/25/H/DY | 7000 | 83.5 | | | 16.5 | 1.4318 |
| 70/25/H/DY | 7000 | 76.6 | | | 23.4 | 1.4408 |
| 70/25/H/DY | 7000 | 81.7 | | | 18.3 | 1.4310 |

As clearly shown on Table 5, through incorporation of different amounts of PEO-900 and PEO-2000, it was possible to improve the water uptake of PDMS based copolymers from less than 1% by weight to over 75% by weight.

TABLE 5

Equilibrium water uptake of PDMS-urea copolymers with and without a gradient interface (50 days at 23 C.)

| Polymer | PDMS (wt %) | Polyether (wt %) | Hard segm (wt %) | Water uptake (wt %) |
|---|---|---|---|---|
| 32/H/DY | 69.6 | — | 30.4 | 0.64 |
| 32/D2000/H/DY | 42.0 | 26.2 | 31.8 | 1.18 |

TABLE 5-continued

Equilibrium water uptake of PDMS-urea copolymers with and without a gradient interface (50 days at 23 C.)

| Polymer | PDMS (wt %) | Polyether (wt %) | Hard segm (wt %) | Water uptake (wt %) |
|---|---|---|---|---|
| 32/D2000/H/DY | 33.7 | 42.1 | 24.2 | 1.69 |
| 32/ED900/H/DY | 49.1 | 13.8 | 37.1 | 10.8 |
| 32/ED900/H/DY | 48.9 | 27.5 | 23.6 | 29.3 |
| 70/ED2003/H/DY | 51.2 | 29.2 | 19.6 | 61.5 |
| 32/ED2003/H/DY | 32.5 | 40.5 | 27.0 | 75.1 |

INVENTIVE EXAMPLE 2

Structure-Property Behavior of Poly(dimethylsiloxane) Based Segmented Polyurea Copolymers Modified with Poly(propylene Oxide))

Introduction

Polydimethylsiloxane's unique set of properties, such as an extremely low glass transition temperature (ca. −123° C.), good thermal, oxidative, hydrolytic, and UV stability, low surface energy, high permeability to many gases, good biocompatibility, etc. have prompted many investigations in its usage for commercial applications. Mark J E. ACS Symposium Series, vol. 729: American Chemical Society, 2000. p1; Yilgor I, McGrath J E. *Adv Polym Sci* 1988; 86: 1-87. Due to very weak inter-molecular interactions, a relatively high critical MW between entanglements of PDMS, ca. 24,500 g/mol [Zang Y H, Carreau P J. *J Appl Poly Sci* 1991; 42: 1965], and the fact that at most application temperatures, generally around ambient, poly(dimethylsiloxane) (PDMS) chains are nearly 150° C. above their glass transition, modification of PDMS is often necessary to achieve usable mechanical properties. These modifications include addition of silica fillers or incorporation of covalent cross-links, via peroxides, for example Yilgor, McGrath, supra. Over the past two decades, considerable attention has been directed at exploiting the properties of PDMS by utilizing it as a soft segment component in segmented copolymers, mainly polyurethanes and polyurethaneureas. Kinning D J. *J Adh Sci* 2001; 75: 1; Hergenrother R W, Yu X H, Cooper S L. *Biomaterials* 1994; 15: 635-640; Ho T, Wynne K J, Nissan R A. *Macromolecules* 1993; 26: 7029-7036; Chun Y C, Kim K S, Shin J S, Kim K H. *Poly International* 1992; 27: 177; Yang C Z, Li C, Cooper S L. *J Poly Sci B: Poly Phy* 1991; 29: 75; Shibayama M, Inoue M, Yamamoto T, Nomura S. *Polymer* 1990; 31: 749-757; Kajiyama M, Kakimoto M, Imai Y. *Macromolecules* 1990; 23: 1244-1248; Tyagi D, Yilgor I, Wilkes GL, McGrath J E. *Polymer* 1984; 25: 1807-1816. Recently we reported the structure-property behavior of high MW segmented polyurethanes and polyurea counterparts based on PDMS as the soft segment (SS) component. Sheth J P, Aneja A, Wilkes G L, Yilgor E, Atilla G E, Yilgor I, Beyer F L. *Polymer* 2004; 45: 6919-6932. We utilized the SS MW, the hard segment (HS) content, and the chain extender type as variables to compare these two different chemical types of copolymers. Within the HS content range that was utilized (16-50 wt %) the copolymers possessed a microphase separated morphology, the extent of which was predominantly governed by the SS MW. In addition, the polyurethane and polyurea copolymers based on PDMS of MW 7000 g/mol and containing ca. 25 wt % HS content displayed broad, nearly temperature insensitive rubber plateaus (above the SS glass transition) that were respectively ca. 200° (−55 to 145° C.) and 230° (−55 to 175° C.) wide. In spite of such remarkably high temperature stability, the use of these copolymers in most structural applications is expected to be somewhat limited for high deformation structural applications due to their inferior ultimate properties, such as tensile strength and elongation at break, as compared to those based on polyether or polyester SS. Other laboratories have also reported similar comparatively inferior mechanical properties of PDMS based polyurethanes. Hergenrother, supra; Chun, supra; Kajiyama, supra; Tyagi, supra. Li et al. [Li C, Yu X, Spechard T A, Cooper S L. *J Poly Sci B: Poly Phy* 1988; 26: 315] attributed such behavior to the extremely high incompatibility between the urethane (or urea) and the PDMS segments, which they postulated, could lead to poor "interfacial adhesion" between the soft and the hard phases. Yilgor et al. have noted that the urea-siloxane interaction energy is 7.5 kJ/mol. Such low interaction energy, as compared to the 19.2 kJ/mol hydrogen bond energy of urea-ether, suggests that the urea-siloxane interaction is of a dipole-dipole type. Yilgor E, Burgaz E, Yurtsever E, Yilgor I. *Polymer* 2000; 41: 849-857. Thus, a lack of inter-segmental hydrogen bonding in PDMS based polyurethane copolymers is another important reason for their poor ultimate tensile properties. Various laboratories have utilized a co-SS, such as poly(tetramethylene oxide), poly(propylene oxide), or poly(ethylene glycol)adipate, in varying proportions with PDMS during the synthesis of polyurethanes. Chun, supra; Rochery M, Vroman I, Lam T H. *J Macromol Sci* 2003; A40: 321; Wang L F, Ji Q, Glass T E, Ward T C, McGrath J E, Muggli M, Burns G, Sorathia U. *Polymer* 2000; 41: 5083-5093; Gunatillake P A, Meijs G F, McCarthy S J, Adhikari R. *J Appl Poly Sci* 2000; 76: 2026-2040; Stanciu A, Airinei A, Timpu D, Ioanid A, Ioan C, Bulacovschi V. *E Poly J* 1999; 35: 1959-1965; Fan Q, Fang J, Chen Q, Yu X. *J Appl Poly Sci* 1999; 74: 2552-2558; Shibayama M, Inoue M, Yamamoto T, Nomura S. *Macromolecules* 1991; 24: 6254-6262. Generally in these studies the facilitation of the synthesis of PDMS based copolymers with high overall MW, and the improvement of their ultimate tensile properties, as compared to those of pure PDMS based polyurethanes were the twin aims driving the use of a co-SS. The two-step prepolymer method was mostly utilized. In the first step, PDMS and a selected co-SS were separately end-capped with a diisocyanate. Thereafter, in the second step, the two prepolymers were mixed in selected proportions and then chain extended with a selected low MW diol (chain extender), such as 1,4-butane diol. In general and as expected, the structure, the MW, and the relative content of the co-SS greatly influenced the extent of the observed modification of the copolymers' morphology and tensile properties as compared to those based on only PDMS as the SS component.

In this Example 2, the structure-property behavior of PDMS based polyurea copolymers that contain a second soft segment component, namely poly(propylene oxide) (PPO) placed along the chain backbone in a very controlled manner is discussed. Specifically, the synthetic strategy adopted here enables the positioning of the PPO segments of selected MW between the PDMS SS and the polyurea HS and this is the noteworthy feature of these copolymers. The solubility parameter of PPO ($23.5\ J^{1/2}/cm^{3/2}$) is in between that of PDMS ($15.6\ J^{1/2}/cm^{3/2}$) and urea ($45.6\ J^{1/2}/cm^{3/2}$). E. A. Grulke. In: Brandup J, Immergut E H, editors. Polymer handbook. New York: John Wiley, 1989. pp. 519-559. In addition, and as noted above, PPO can undergo hydrogen bonding with the urea HS. Both of these factors can potentially lead to inter-segmental mixing (between PPO and urea segments), which would then modify the nature of the interface between the soft matrix and the hard urea microdomains (provided the material develops a microphase morphology). Such behavior would preferably lead to the formation of a gradient interface instead of a sharp transition, which is expected in polyureas based on pure PDMS as the SS. Under an applied load, a gradient interface can aid in transferring the stresses from the soft matrix to the hard domains more effectively, thereby potentially improving the tensile properties of the silicone-urea copolymers.

Experimental

Synthesis was performed according to Scheme 1 set forth above. Polymer nomenclature and specimen preparation for testing is described herein. The copolymer films (0.3-0.5 mm thick) utilized for analysis were cast from IPA solution into poly(tetrafluoroethylene) molds, dried at room temperature overnight, thereafter they were further dried at 65° C. until a constant weight was reached. The copolymers were stored at ambient temperature under vacuum until they were analyzed. The samples used in this Example 2 are listed in Table 6 and identified by the nomenclature:

PDMS MW-PPO MW-HS content (wt %)

Thus, P3.2-D0.4-18, for example, refers to a segmented polyurea based on PDMS of MW 3200 g/mol, PPO of MW 450 g/mol and a HS content of 18 wt %. The six samples in Table 6 are divided into two sets. One set of three samples is based on PDMS of MW 3200 g/mol and the other on PDMS of MW 7000 g/mol. Note that, herein, the single HMDI molecules that connect the PDMS segments to the PPO segments are not considered to be part of the HS sequence. The overall HS content is thus calculated on this basis. If, on the other hand, one were to consider these HMDI molecules to be part of the HS then the HS content of the copolymers with PPO co-SS would be higher by 5-9 wt % than stated in Table 6.

TABLE 6

Composition and average hard segment sequence MW of PDMS based segmented polyurea copolymers with or without PPO co-soft segments.

| Sample | Molar Composition (PDMS/ PPO/ HMDI/ Dytek) | PDMS (wt %) | PPO (wt %) | Average HS MW* (g/mol) | HS Content* (wt %) |
|---|---|---|---|---|---|
| P3.2-D0-36 | 1/0/5/4 | 65.1 | — | 1780 | 35.7 |
| P3.2-D0.4-18 | 1/2/5/2 | 57.3 | 16.1 | 1020 | 18.0 |
| P3.2-D2.0-22 | 1/2/8/5 | 32.7 | 40.9 | 2150 | 21.8 |
| P7.0-D0-20 | 1/0/5/4 | 80.3 | — | 1780 | 20.2 |
| P7.0-D0.4-11 | 1/2/5/2 | 74.6 | 9.6 | 1020 | 10.8 |
| P7.0-D2.0-16 | 1/2/8/5 | 51.5 | 29.5 | 2150 | 15.7 |

*The HMDI molecules in the SS sequence are not considered to be part of the HS.

Characterization Methods

A Seiko Instruments model DMS210 was used for dynamic mechanical analysis (DMA). Under a dry nitrogen atmosphere, the samples were quenched from room temperature to −150° C. using liquid nitrogen and immediately thereafter subjected to a 2° C./min heating scan; Tan δ and storage modulus, E', data were obtained at a frequency of 1 Hz.

A Phillips X-ray generator, model PW1729, operating at 40 kV and 20 mA and generating nickel filtered $CuK_\alpha$ radiation with a wavelength of 1.542 Å was used to record the small angle X-ray scattering (SAXS) profiles. The scattering patterns were collected by a Kratky camera with a 0.03×5 $mm^2$ slit collimation in conjunction with a Braun OED50 position-sensitive detector. The raw scattering data was corrected for parasitic scattering and normalized by sample thickness and exposure time. The intensity data was also normalized by using a Lupolen standard.

Ambient temperature tensile testing was conducted by using an Instron, model 4400R, equipped with a 1-kN tension load cell and calibrated with a 2 kg standard (19.61 N). "Dog-bone" shaped film specimens, 2.9 mm wide and having a grip separation distance of 10 mm were used to generate the stress-strain curves at a crosshead speed of 25 mm/min. Three samples were tested for each copolymer and the average Young's modulus of these three runs is reported. Only representative stress-strain responses are presented in the appropriate figure. Stress relaxation studies were also performed on similar dog-bone shaped specimens. Strain levels of 25% or 125% were utilized. Mechanical hysteresis experiments were conducted by using strain levels of 25% or 100% for two uniaxial deformation cycles each and at a crosshead speed of 25 mm/min. A given deformation cycle was started immediately after the completion of the previous one.

Dynamic Mechanical Analysis

The storage modulus, E' and Tan δ0 response of the three samples which are based on PDMS-3200 are presented in FIGS. 3a and b respectively. These three specific samples contain only PDMS as the SS(P3.2-D0-36), PDMS plus PPO co-SS of MW 450 g/mol as the SS (P3.2-D0.4-18), or PDMS plus PPO co-SS of MW 2000 g/mol as the SS (P3.2-D2.0-22). It is important to note that that due to the stoichiometry of the reaction mixtures and the differences in the oligomer MWs utilized during synthesis, the three samples in each set not only have different HS content (hence, average HS length) but their overall SS MW is also different. These facts have important ramifications on the copolymers' DMA response, which is discussed below.

Figure 3:
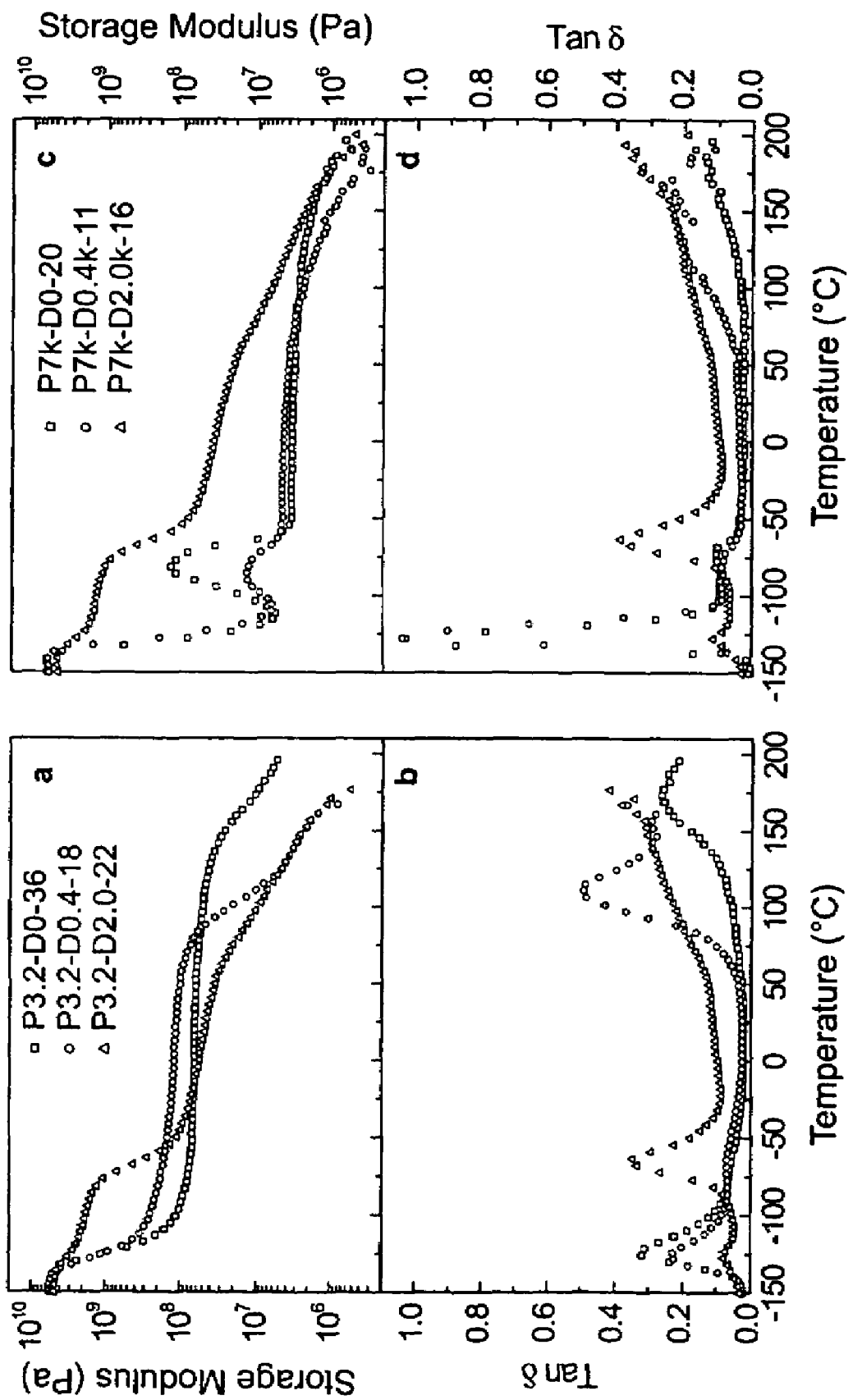
FIG. 3 are graphs showing storage modulus and Tan δ responses of segmented polyurea copolymers based on PDMS-3200 (a and b respectively) and PDMS-7000 (a and b respectively) soft segments and containing PPO co-soft segments, where noted.

Referring to FIG. 3, the following is noted. Focusing on the E' response of P3.2-D0-36 having only PDMS as the SS component, note that below the relatively sharp PDMS SS glass transition (at ca. −125° C. from Tan δpeak), as expected, the sample behaves as a rigid solid. A broad and nearly temperature insensitive rubbery plateau follows thereafter, which extends from −100 to 140° C. The low SS $T_g$, which is only slightly higher than that of pure PDMS (ca. −130° C., Ref. 22) coupled with the remarkably broad rubbery plateau or 'service window' indicates that this sample has a well microphase separated morphology. The increase in the PDMS SS $T_g$ as compared to that of the neat PDMS no doubt arises due to the restrictions imposed on the PDMS segment ends by the covalently linked HS. Thus, the factors that facilitate the observed rubbery plateau breadth and the average plateau modulus are (1) the HS content and the extent of HS connectivity of the sample, (2) the bidentate hydrogen bonding mediated cohesiveness of the urea HS, (3) the sample's relatively high extent of microphase separation, (4) low $T_g$ of its SS phase, and (5) the high thermal stability of PDMS. As expected, the softening of the HS phase results in a decline in E' after the rubbery plateau region.

The E' behavior of the sample, P3.2-D0.4-18, having PPO-450 as co-SS is in general similar to the pure PDMS based copolymer but with a few distinct differences. The former sample displays a higher average plateau modulus than the latter despite having a longer SS and only about half the HS content as the latter (see Table 6). Such behavior is believed to arise due to (1) the ability of the PPO SS to establish a hydrogen bond network with the urea HS [Yilgor E, Yilgor I, Yurtsever E. *Polymer* 2002; 43: 6551-6559], which results in a more effective stress transfer from the PDMS dominated soft matrix to the hard urea domains, and (2) increased restrictions imposed by the urea segments that may be mixed with the PPO segments. The narrower rubbery plateau in P3.2-D0.4-18 as compared to that in P3.2-D0-36 is, no doubt also due to the lower HS content (hence, shorter HS's) of the sample. In addition, the formation of the above noted inter-segmental hydrogen bond network, shorter HS, and greater segmental mixing (between PPO and urea segments) may also lower the temperature range over which the HS soften, thereby resulting in a reduction in the breadth of the rubbery plateau and also its temperature sensitivity.

In contrast, in the E' response of P3.2-D2.0-22, a broader PDMS SS glass transition at ca. −125° C. is noted after which follows a relatively narrow and temperature sensitive plateau that extends up to ca. −60° C. The average modulus of the plateau in this temperature range is on the order of $10^9$ Pa. Such behavior indicates that above the PDMS $T_g$ but below the $T_g$ of PPO, the soft PDMS phase is reinforced not only by the urea hard domains but also experiences restriction to its movement from the glassy PPO phase. Thereafter, interestingly, a distinct decrease in E' is noted, which is due to the PPO SS glass transition ($T_g$ at ca. −65° C., from Tan δpeak). The PPO SS $T_g$ is also slightly higher than that of the uncoupled pure PPO-2000 oligomeric (ca. −73° C., Ref. 24). A temperature sensitive rubbery plateau follows this transition after which one observes a decline in E' that starts at a significantly lower temperature than in the other two PDMS-3200 based samples. From this DMA data, the extent of the PPO-2000 and PDMS-3200 inter-segmental mixing above the PPO $T_g$ cannot be easily discerned. However, the possible inter-segmental hydrogen bonding between the PPO and urea segments is expected to enrich the interface around the urea domains by the PPO segments. A limited PPO and urea inter-segmental mixing is therefore inevitable, which may well be the underlying reason for the temperature sensitive and narrower rubbery plateau of P3.2-D2.0-22.

The Tan δ response of the three copolymers, presented in FIG. 3b is slightly more informative than the corresponding E' response. The sample, P3.2-D0-36 displays a damping peak centered at ca. −125° C., which is the PDMS glass transition. Pure PDMS oligomers of $<M_n>$ greater than 2200 g/mol have been shown to crystallize; they melt at ca. −55° C. [Clarson S J, Dodgson K, Semlyen J A. *Polymer* 1985; 26: 930-934]. The melting of the PDMS segments in P3.2-D0-36 is also noted by the presence of a shoulder (between −75 to −50° C.), which is convoluted with the higher temperature region of the PDMS glass transition peak. The PDMS melting transition cannot be clearly noted in this sample's E' response. An increase in the Tan δ response above 130° C. due to the softening of the hard domains is again observed, which corresponds to the decrease in E' as discussed earlier. In the sample, P3.2-D0.4-18 the intensity of the PDMS glass transition is slightly lower due to the lower PDMS content of this sample as compared to that in P3.2-D0-36. However, the transition maximum in the former sample still occurs at ca. −125° C. In light of the higher PDMS content in this sample (57 wt %) as compared to its PPO content (16 wt %) and the low MW of the PPO segments (450 g/mol), the convoluted shoulder in the Tan δ response of P3.2-D0.4-18 in the upper temperature limit of the PDMS glass transition peak is conjectured to arise due to the melting of that fraction of the PDMS segments that crystallized, as was discussed earlier. However, the PDMS melting transition is not clearly evident in the E' response of P3.2-D0.4-18. In contrast, the PDMS glass transition peak in the final sample P3.2-D2.0-22 is greatly suppressed. Thus, within the series of the three PDMS-3200 based samples, it is noted that the decrease in the PDMS glass transition peak intensity is consistent with the overall decrease in the PDMS content of the samples. However, the peak intensity in P3.2-D2.0-22 is much lower than that of the PPO glass transition peak in this sample despite the PPO content of the sample (41 wt %) being only slightly higher than its PDMS content (33 wt %). Such behavior is observed because while the PDMS segments are undergoing a glass transition, they experience restrictions to their movement not only by the urea HS but also by the glassy PPO segments. As discussed earlier, the high average plateau value between ca. −125 and −60° C. in sample P3.2-D2.0-22 also occurs due to similar reasons. Furthermore, in this sample a distinct PPO glass transition peak centered at −65° C. can be seen. Thus, it is interesting to observe that the PPO-2000 segments are long enough to segregate and form a PPO rich phase. The dependence of the extent of microphase separation in segmented polyurethanes on the SS MW is well known and such behavior was also demonstrated in our earlier study [Sheth et al., supra] in both segmented polyurethanes as well as polyureas based on PDMS as the SS. Due to the similar temperature range over which PDMS melting and PPO glass transition occur, no distinct sign of a PDMS melting transition, if any, is evident in sample P3.2-D2.0-22.

Referring to FIGS. 3c and d in which the DMA response of the three samples based on PDMS-7000 are presented, it can be observed that, in general, their E' response is similar to the PDMS-3200 counterparts but with some noteworthy differences. Despite the lower HS content of the PDMS-7000 samples (see Table 6) they display rubbery plateaus that remain temperature insensitive up to higher temperatures as might be expected due to an improved extent of microphase separation in these comparatively high PDMS MW (7000 g/mol) based copolymers. In addition, a peak in the E' response of P7.0-D0-20 can be observed following the PDMS glass transition, which occurs due to some further distinct crystallization and melting of the PDMS-7000 segments. This transition in P7.0-D0.4-11 is greatly suppressed despite only a slightly lower PDMS content as compared to that in P7.0-D0-20. Such behavior clearly indicates that the PPO co-SS greatly suppresses any further crystallization of the PDMS phase during the heating cycle. As expected, the average rubbery plateau moduli of these two samples are lower than the corresponding PDMS-3200 based counterparts due to the lower HS contents of the former coupled with the fewer restrictions experienced by the longer length of the PDMS-7000 segments. Despite the obvious structural differences, P7.0-D2.0-16 displays a very similar E response to P3.2-D2.0-22, which suggests the presence of limited PPO and urea inter-segmental mixing in both samples, which potentially results in the formation of a gradient interface between the hard urea microdomains and the soft matrix.

The Tan δ response of the PDMS-7000 based samples is also very similar to the PDMS-3200 counterparts other than the nearly PPO MW independent $T_g$ of the PDMS-7000 phase occurs at ca. −129° C., which is slightly lower than that in the former samples (at ca. −125° C.). Moreover, the PDMS melting transition is more clearly separated from the PDMS glass transition peak in P7.0-D0-20 and also P7.0-D0.4-11. In the sample, P7.0-D2.0-16, the PPO-2000 segments suppress the low temperature PDMS crystallinity to such an extent that its presence cannot be clearly discerned in the Tan δ response and as noted above, the large PPO glass transition peak in the temperature range where PDMS melting generally occurs further complicates deconvolution of these two transitions.

Small Angle X-ray Scattering

Figure 4:
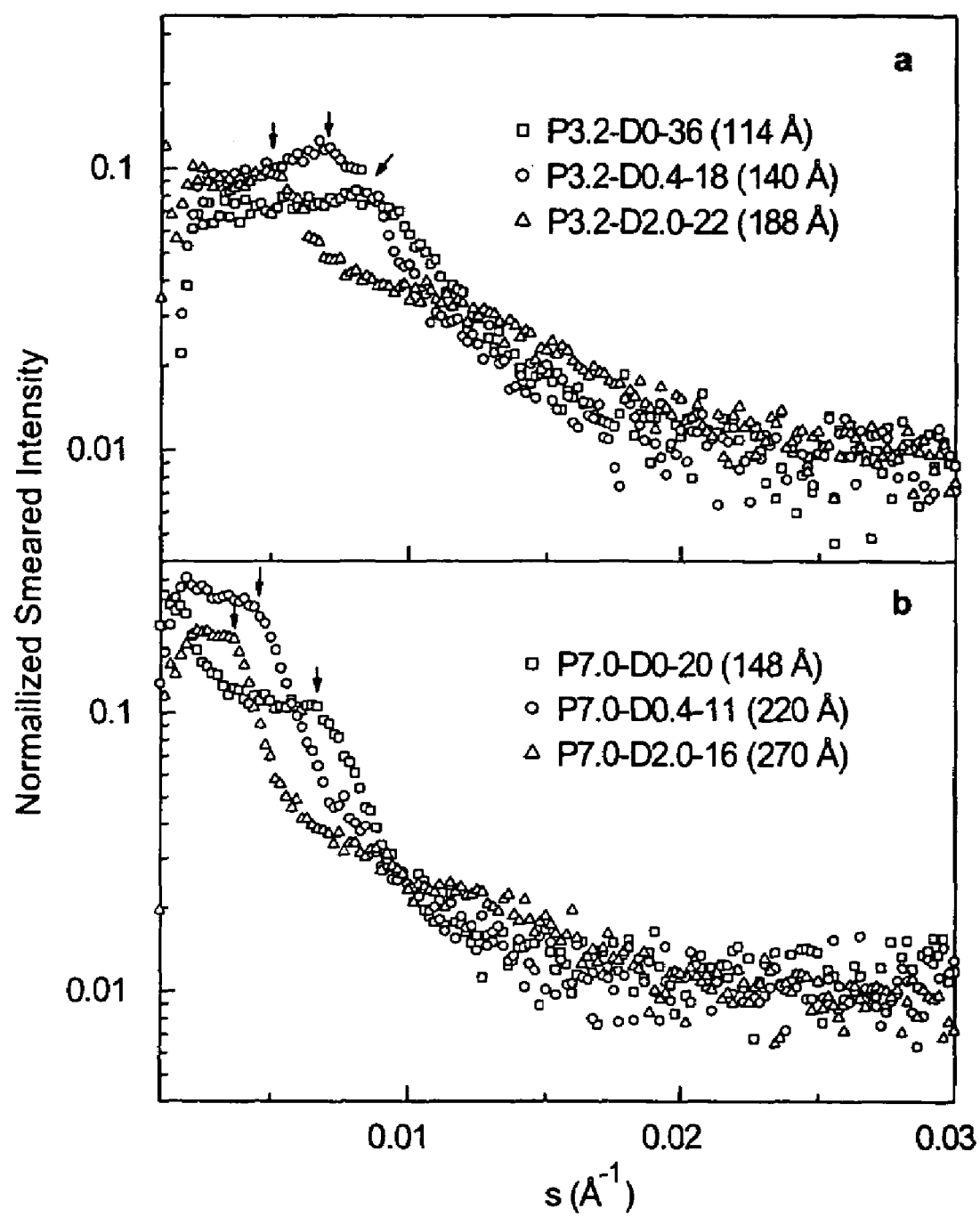
FIG. 4 are slit-smeared small angle X-ray scattering profiles of segmented polyurea copolymers based on PDMS-3200 (a), and PDMS-7000 (b) soft segments and containing PPO co-soft segments, where noted. Arrows denote the approximate position of the first order interference shoulders in the respective given samples.

The ambient temperature normalized slit-smeared SAXS intensity profiles of the six samples addressed in this chapter are presented in FIG. 4 as a function of the scattering vector 's' (=2 sin(θ/2)/λ, where θ is the radial scattering angle and λ(=1.542 Å) the wavelength of incident radiation). All six samples listed in Table 6 exhibit a broad shoulder in their respective scattering profiles. The clear message from the SAXS data is that all six samples distinctly posses some level of a microphase separated morphology and therefore it is consistent with the respective DMA responses. The slit-smeared 'd' spacing of a given sample, which is approximated by $1/s_{max}$ according to Bragg's law, is noted in brackets next to the respective legend in FIG. 4.

Within the PDMS-3200 as well as the 7000 based series shown in FIGS. 4a and b respectively, as expected, the 'd' spacing increases with increasing PPO MW. In the two pure PDMS based samples it is clear from the DMA and SAXS data that the morphology should consist of urea hard domains dispersed in a matrix dominated by the PDMS segments but which must also contain limited dissolved HS. These results are consistent with our earlier study [Sheth et al., supra]. In the samples with a co-SS also, the preceding results distinctly indicate the presence of hard domains dispersed in the soft matrix. However, it is difficult to determine the extent of the PPO-PDMS and PPO-urea inter-segmental mixing, especially in the PPO-450 based samples. In addition, the reader may recall that DMA data clearly indicated the presence of a PPO rich phase in P3.2-D2.0-22 and P7.0-D2.0-16. For reasons discussed earlier, the interfacial region between the hard domains and the soft matrix, however, is certainly expected to be richer in PPO as compared to PDMS segments. In fact, based on the DMA and SAXS results, it is reasonable to expect a gradient interface (consisting of mixed PPO and urea segments) between the hard urea microdomains and the soft matrix in P3.2-D2.0-22 and P7.0-D2.0-16.

Stress-Strain Behavior

Figure 5:
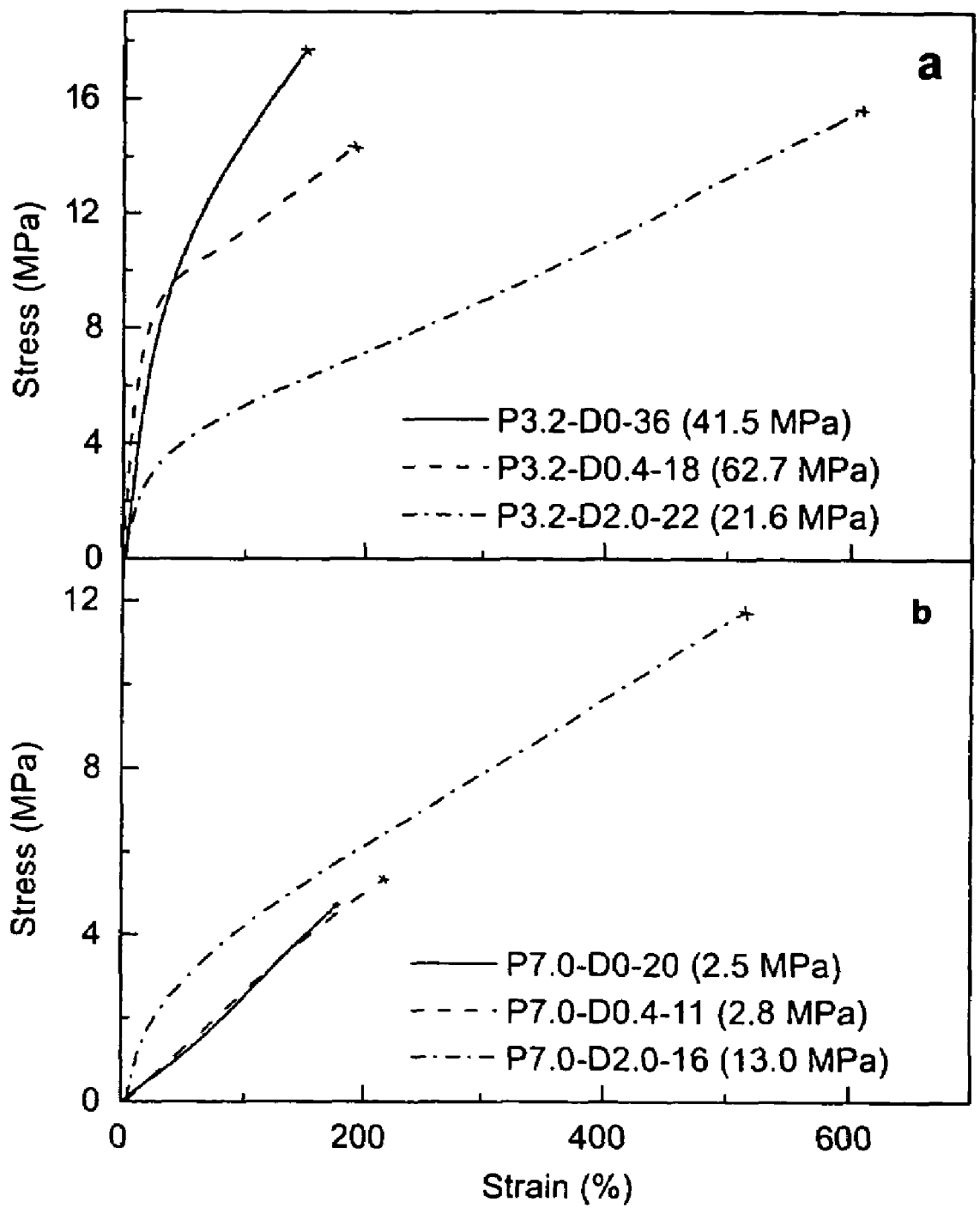
FIG. 5 are graphs showing stress-strain response of segmented polyurea copolymers based on PDMS-3200 (a), and PDMS-7000 (b) soft segments and containing PPO co-soft segments, where noted.

The ambient temperature stress-strain behavior of the polyurea copolymers is presented in FIG. 5. The respective Young's modulus values are listed in brackets next to a sample's legend. From FIG. 5a it is observed that the sample containing only PDMS SS (P3.2-D0-36) displays a Young's modulus and tensile strength of 41.5 and ca. 18 MPa respectively and a strain at break, which is only slightly higher than 100%. The lack of a yield point suggests that there is insufficient percolation of the hard phase through the soft matrix despite its relatively high HS content. The Young's modulus of P3.2-D0.4-18 is nearly fifty percent higher despite the lower HS content of the sample (18 versus 35 wt %). However, the incorporation of PPO segments along the chain backbone and its lower HS content lead to a distinctly lower tensile strength. The strain at break exhibited by the sample with PPO-450 co-SS is similar to the pure PDMS based copolymer. The sample, P3.2-D2.0-18 displays the lowest Young's modulus amongst the three PDMS-3200 based copolymers. A distinct improvement in the strain at break without any considerable loss in tensile strength can also be observed in this sample. It must be noted that P3.2-D2.0-22 has comparable HS content as P3.2-D0.4-18 but the average MW of the HS in the former is greater than the other two samples in the PDMS-3200 based copolymers due to the incorporation of PPO co-SS of MW 2000 g/mol. Therefore, the considerably improved elongation at break exhibited by P3.2-D2.0-22 underscores the importance of the length of the HS and inter-segmental hydrogen bond network (which generates a more diffuse or gradient interface between the hard domains and the soft matrix), apart from the overall HS content, in governing the stress-strain response of segmented copolymers.

Referring to FIG. 5b, in the PDMS-7000 based samples note that P7.0-DO-20 displays the lowest Young's modulus, tensile strength, and strain at break. The PDMS copolymer with PPO-450 co-SS displays similar behavior as the pure PDMS-7000 sample. On the other hand, for reasons noted above, P7.0-D2.0-16 posses a greatly improved tensile behavior over the other two samples in the series.

Stress Relaxation

Figure 6:
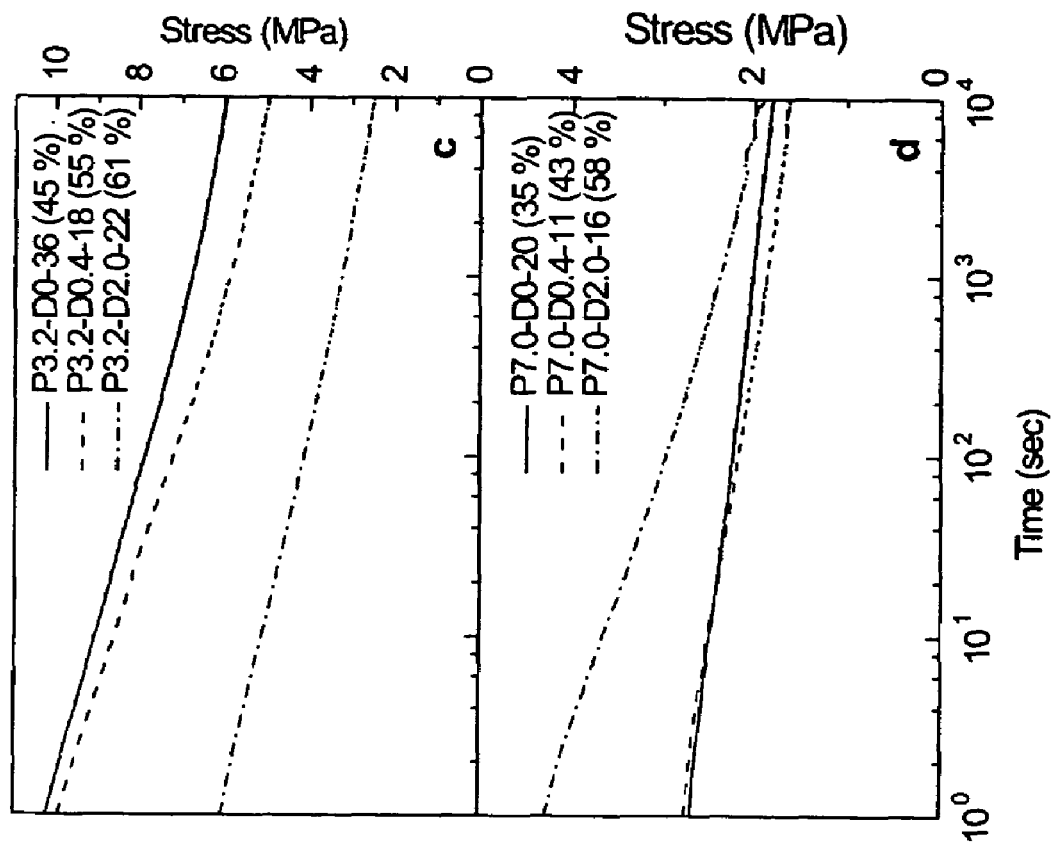
FIG. 6 are graphs showing stress relaxation at 25% (a and b) or 125% (c and d) strain of segmented polyurea copolymers based on PDMS-3200 and PDMS-7000 soft segments and containing PPO co-soft segments, where noted.
Figure 6:
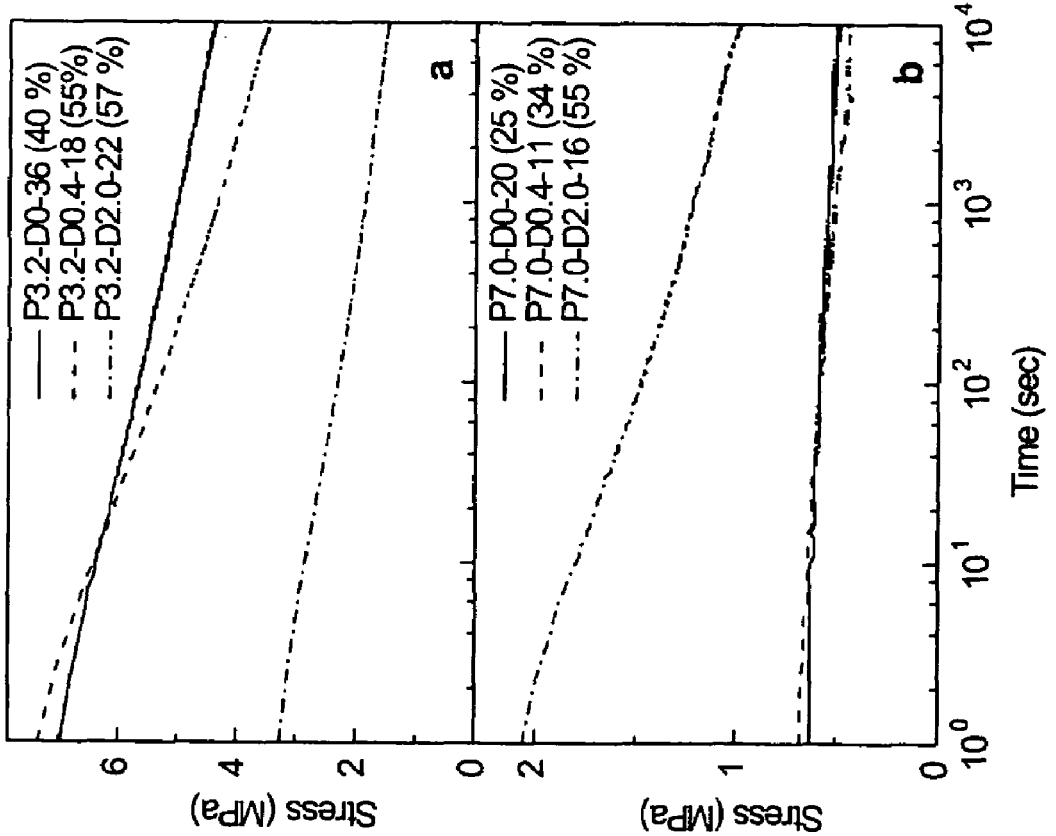

In addition to the stress-strain response it is also of practical interest to investigate the effect of PPO co-SS on these segmented polyurea copolymers' stress relaxation behavior. In light of the inter-segmental mixing promoted by the PPO co-SS, the extent of stress relaxation in the samples containing PPO is expected to be greater than in those copolymers containing only PDMS as the SS component. For all six copolymers, the stress relaxation results at strains of 25% and 125% are presented in FIGS. 6a-d respectively. The extent of the stress relaxation of a sample was quantified as the ratio of the absolute decrease in the stress at t=10,000 seconds (ca. 3 hours) to the stress immediately recorded after the sample was first stretched. The samples were stretched to a fixed strain of 25% or 125% in 1 and 5 seconds respectively. The percent stress relaxation numbers are listed next to the respective sample legend in FIG. 6. From FIGS. 6a and b, it can be noted that at 25% strain, both the PDMS-3200 and 7000 based copolymers (no PPO) display a nearly linear stress relaxation with log (time). These results indicate that the copolymer chains in these samples have a single relaxation time, or at least a narrow distribution, under these experimental conditions. Furthermore, the relaxation is mainly expected to occur in the soft matrix due to its higher degree of mobility at ambient temperature.

Within both sub-series, the extent of stress relaxation increases with increasing PPO MW (hence, content). As noted earlier, the PPO-2000 co-SS containing samples are expected to have a distinct gradient interface between the urea hard domains and the soft matrix, which may be responsible for the increased extent of stress relaxation in these copolymers. The increased stress relaxation may well be disadvantageous in certain structural applications of these copolymers where the material is expected to resist a constant strain. However, it must be pointed out that due to the very different compositions of the soft matrix in the copolymers within a given sub-series and the thickness of the interface between the soft matrix and the dispersed urea domains, the constant applied strain is expected to generate very different levels of stress, which in turn will result in differing extents of activation of the soft matrix.

At 125% strain, the stress relaxation for the six copolymers (FIGS. 6c and d) also decreases linearly with log (time). The trend of increasing stress relaxation with PPO incorporation is also evident at 125% strain. Interestingly, in the two pure PDMS based samples the stress relaxation is distinctly higher at 125% strain than at 25%. However, in the remaining samples it is comparable at both the strain levels.

Mechanical Hysteresis

Figure 7:
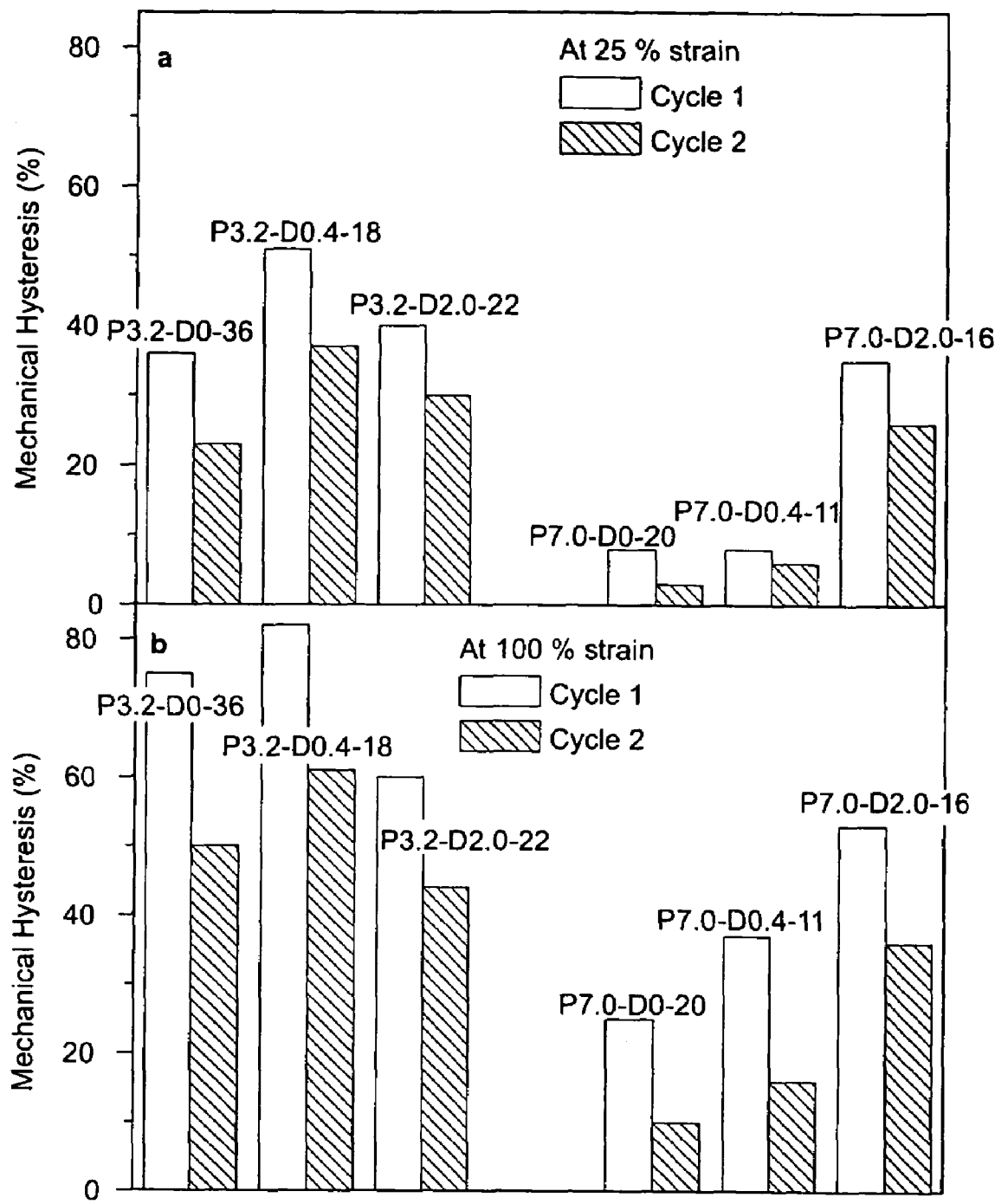
FIG. 7 includes bar graphs showing mechanical hysteresis exhibited by segmented polyurea copolymers based on PDMS-3200 and PDMS-7000 soft segments and containing PPO co-soft segments, where noted, at 25% strain (a), and 100% strain (b).

The mechanical hysteresis (MH) behavior, which is also of importance in structural applications, is presented in FIG. 7. Each copolymer listed in Table 6 was subjected to strain levels of 25% (FIG. 7a) and 100% (FIG. 7b) for two uniaxial deformation cycles each. FIG. 7 shows that, under the test conditions employed, for a given copolymer the extent of MH is higher during the first cycle than the second. Such behavior arises due to the fact that once the original microstructure becomes disrupted during the first cycle it does not have enough time to completely 'heal' before the next cycle is initiated. In addition, the MH during the two cycles of any PDMS-3200 based sample is higher than the corresponding PDMS-7000 copolymers. Within the PDMS-7000 series, at 25% and 125% strain, the extent of MH during both cycles increases with increasing PPO MW (or content) believed due to the inter-segmental mixing promoted by the PPO co-SS. On the other hand, in the PDMS-3200 series, it is the highest in the PPO-450 containing samples.

Figure 8:
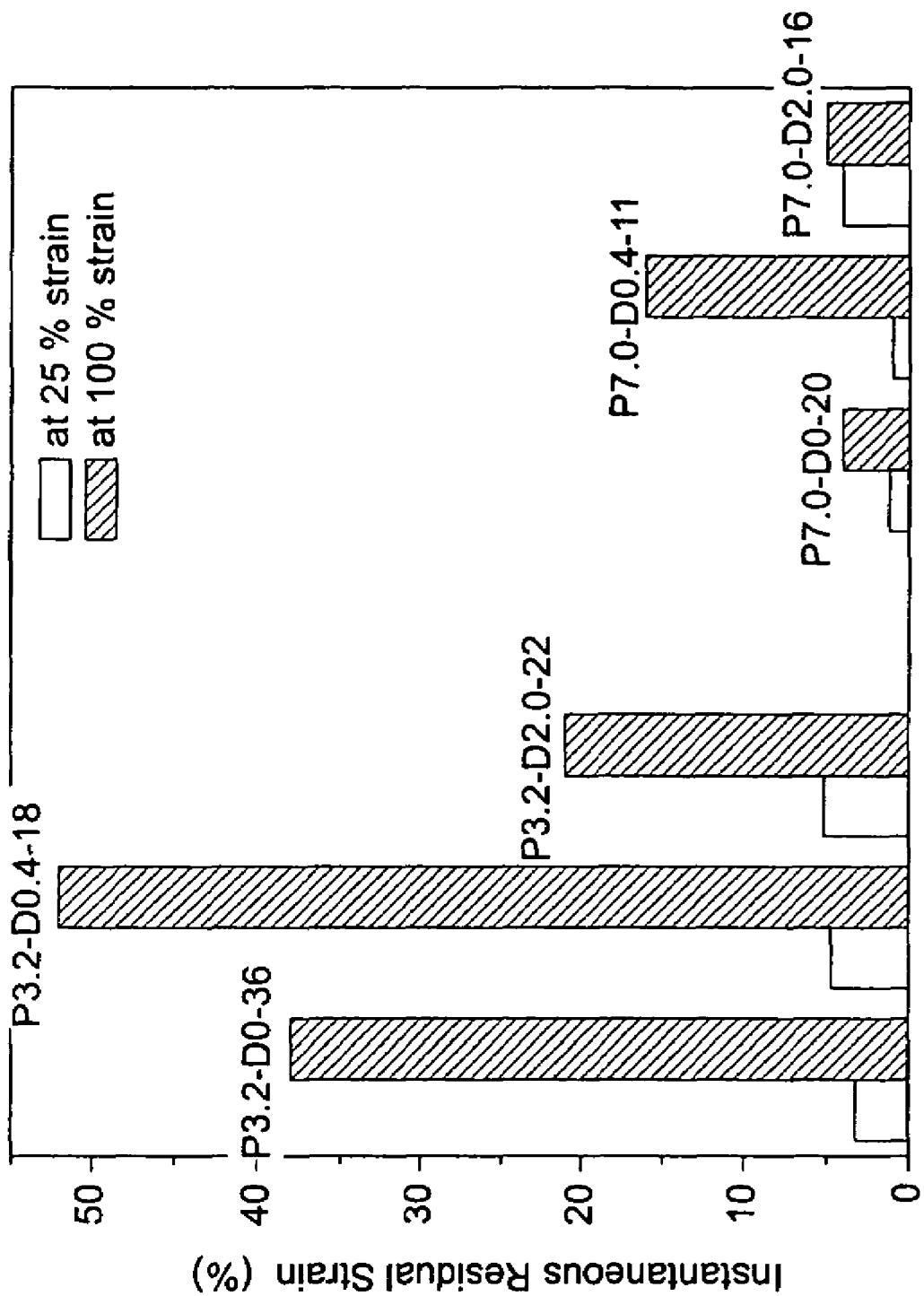
FIG. 8 is a bar graph showing instantaneous residual strain at zero stress in segmented polyurea copolymers after the completion of the first hysteresis cycle.

Another parameter that can be measured during hysteresis experiments is the residual strain at zero stress that is exhibited by the sample immediately after the completion of one full cycle. Such an 'instantaneous set' should not be confused with the more commonly utilized quantity, permanent set, which, as the term suggests, is the residual strain at a given temperature after a fixed time interval. The instantaneous set exhibited by the six copolymers immediately after the completion of the first cycle is presented in FIG. 8.

Interestingly, all six samples display very comparable instantaneous set when the samples are elongated to 25% strain. However, at 100% strain, the PDMS-7000 based copolymers return closer to their initial dimensions than the PDMS-3200 counterparts which is believed due to the comparatively lower levels of stresses experienced by the matrix of the PDMS-7000 samples. In addition, the two PPO-450 containing samples display a higher relative instantaneous set than the other two samples in their respective series due to potential greater amount of inter-segmental mixing of the shorter PPO segments and the shorter urea hard segments.

In summary for this Example 2, PPO co-SS were incorporated in PDMS based segmented polyurea copolymers in order to improve the ultimate tensile properties of polyureas copolymers that use only PDMS as the SS component. The PPO co-SS of MW 450 or 2000 g/mol were incorporated in a controlled manner between the PDMS and the urea segments. PPO was selected as the co-SS due to its ability to undergo inter-segmental hydrogen bonding with the urea segments and such a network was expected to generate a diffuse or gradient interface between the hard domains and the soft matrix. In turn, such a gradient interface, instead of a sharp one, was expected to improve the effectiveness with which the stresses are transferred from the soft matrix to hard domains. PDMS of MW 3200 or 7000 g/mol were used and the HS content of the copolymers ranged between 10 and 35 wt %. DMA demonstrated that copolymers with only PDMS as the SS component possessed a remarkably broad and nearly temperature insensitive rubbery plateau; it extended from −100 to 140° C. in PDMS-3200 based polyurea whereas in PDMS-7000 based polyurea it originated from −55° C. and extended up to 175° C. The incorporation of PPO segments resulted in narrower and more temperature sensitive rubbery plateaus. DMA also indicated that the PPO co-SS containing copolymers utilized in this study also possessed a microphase morphology. DMA and SAXS results suggested that a limited inter-segmental mixing between the PPO and the urea segments leads to the formation of a gradient interface, especially in the PPO-2000 co-SS containing copolymers. Interestingly, the PPO segments of MW 2000 were also able to segregate from the PDMS segments (MW 3200 or 7000) thereby leading to a complex multiphase morphology. Microphase separation in the copolymers utilized in this study was also confirmed with ambient temperature SAXS measurements and which, as expected, also demonstrated that the inter-domain spacing in the copolymers increased systematically with increasing overall SS MW.

Distinct improvements in tensile strength and elongation at break were achieved by PPO 2000 g/mol co-SS containing polyureas as compared to only PDMS based counterparts due to the formation of a gradient interface. The samples, P3.2-D2.0-22 and P7.0-D2.0-16 exhibited an elongation at break in excess of 500% and tensile strength of ca. 12 and 16 MPa respectively. However, the extent of stress relaxation and mechanical hysteresis of the PPO c-SS containing copolymers increased as compared to only PDMS based segmented polyureas.

The results of this Example 2 clearly demonstrate the importance of inter-segmental hydrogen bonding between the co-SS and the HS and the resulting gradient interface in addition to other factors such as the extent of microphase separation, the copolymer's HS content, the MW of PDMS, and the MW of the co-SS in improving the ultimate tensile properties of PDMS based polyurea copolymers. Thus, this Example 2 demonstrates that co-SS may be incorporated in segmented PDMS based polyureas to modify their properties for specific applications.

Poly(propylene oxide) (PPO) thus incorporated in a controlled manner between poly(dimethylsiloxane) (PDMS) and urea segments in segmented polyurea copolymers and their solid state structure-property behavior was investigated. The copolymers contained PDMS segments of MW 3200 or 7000 g/mol and an overall hard segment content of 10-35 wt %. PPO segments of MW 450 or 2000 g/mol were utilized. Equivalent polyurea copolymers based on only PDMS as the soft segment (SS) component were used as controls. The materials (with or without PPO) utilized in this study were able to develop a microphase morphology as determined from dynamic mechanical analysis (DMA) and small angle X-ray scattering (SAXS). DMA and SAXS results suggested that the ability of the PPO segments to hydrogen bond with the urea segments results in a limited inter-segmental mixing which leads to the formation of a gradient interface, especially in the PPO-2000 co-SS containing copolymers. DMA also demonstrated that the polyureas based on only PDMS as the SS possessed remarkably broad and nearly temperature insensitive rubbery plateaus that extended up to ca. 175° C., the upper temperature limit depending upon the PDMS MW. However, the incorporation of PPO resulted in more temperature sensitive rubbery plateaus. A distinct improvement in the Young's modulus, tensile strength, and elongation at break in PPO-2000 containing copolymers was observed due to inter-segmental hydrogen bonding and the formation of a gradient interface. However, when PPO was incorporated as the co-SS, the extent of stress relaxation and mechanical hysteresis of the copolymers increased relative to the segmented polyureas based on the utilization of only PDMS as the soft segment component.

The segmented copolymers of the present invention have a variety of uses, such as, e.g., as an intraocular lens; an elastomer; a biomaterial; a contact lens; a surface modifying agent; a bulk modifying (toughening) additive; an additive for an adhesive formulation; etc.

While the invention has been described in terms of its preferred embodiments, those skilled in the art will recognize that the invention can be practiced with modification within the spirit and scope of the appended claims.

What we claim as our invention is:

1. A method of preparing a segmented polymer, comprising the steps of:
   (i) forming solutions of $\alpha,\omega$-amine or hydroxy terminated polydimethylsiloxane, a diisocyanate, an $\alpha,\omega$-amine or hydroxyl terminated polyether and a low molecular weight diamine or a diol, where total equivalents of isocyanate groups is equal to the sum of the equivalents of reactive groups in other reactants,
   (ii) adding $\alpha,\omega$-amine or hydroxy terminated polydimethylsiloxane solution to a diisocyanate solution and reacting them,
   (iii) adding $\alpha,\omega$-amine or hydroxy terminated polyether solution to a solution resulting from (ii) and reacting them, and
   (iv) adding low molecular weight diol or diamine and reacting them.

2. The method of claim 1 wherein said solution includes an alcohol as a solvent.

3. The method of claim 2 wherein said alcohol is isopropanol.

4. The method of claim 1 wherein said diamine is combined with said alcohol prior to said step of adding being performed.

5. The method of claim 1 wherein said diisocyanate has the general structure OCN—R—NCO, where R is an alkylene, arylene, or aralkylene moiety having 4 to 20 carbon atoms, said diamine has the general structure $HR_1N$—$R_2$—$NR_1H$, where $R_1$ is a hydrogen, halogen, or alkyl group having 1-4 carbon atoms, and $R_2$ is an alkylene, arylene, or alkarylene group having 2 to 20 carbon atoms, and said diol has the general structure HO—$R_3$—OH, $R_3$ is an alkylene, arylene, or alkarylene group having 2 to 20 carbon atoms.

* * * * *